United States Patent [19]
Haan et al.

[11] Patent Number: 5,330,149
[45] Date of Patent: Jul. 19, 1994

[54] BREAKAWAY ACCESSORY MOUNTING FOR VEHICLES

[75] Inventors: Theodore M. Haan, Byron Center; Wayne Vandenbrink, West Olive; Stephen J. Forbes, Wyoming; Dennis J. TenBroeke, Hudsonville, all of Mich.

[73] Assignee: Donnelly Corporation, Holland, Mich.

[21] Appl. No.: 10,615

[22] Filed: Jan. 28, 1993

[51] Int. Cl.$^5$ ............................................. F16M 13/00
[52] U.S. Cl. .................... 248/549; 248/475.1; 248/900
[58] Field of Search .............. 248/475.1, 549, 900, 248/220.2, 222.3, 225.1; 359/871, 872

[56] References Cited

U.S. PATENT DOCUMENTS

| | | |
|---|---|---|
| 210,699 | 12/1878 | Macy . |
| 1,362,690 | 12/1920 | Galt, Jr. . |
| 1,371,806 | 3/1921 | Oulianine . |
| 1,475,865 | 11/1923 | Peters . |
| 2,948,317 | 8/1960 | Munro . |
| 3,576,437 | 4/1971 | Peron . |
| 3,596,867 | 8/1971 | Allander . |
| 3,703,270 | 11/1972 | Derrick ............................ 248/549 |
| 4,071,217 | 1/1978 | Kongelka . |
| 4,074,888 | 2/1978 | Garner . |
| 4,596,504 | 6/1986 | Gunther . |
| 4,668,059 | 5/1987 | Ohyama ............................ 359/872 |
| 4,764,004 | 8/1988 | Yamada et al. . |
| 4,776,624 | 10/1988 | Sakuma . |
| 4,848,888 | 7/1989 | Polzer ............................ 248/549 X |
| 4,888,072 | 12/1989 | Ohlenforst . |
| 4,909,470 | 3/1990 | Clark ............................ 248/900 X |
| 4,948,085 | 8/1990 | Mittelhauser ........................ 248/549 |
| 4,957,265 | 9/1990 | Seitz ............................ 359/871 X |
| 5,058,851 | 10/1991 | Lawlor ............................ 248/900 X |
| 5,098,058 | 3/1992 | Polzer et al. . |
| 5,100,095 | 3/1992 | Haan ............................ 248/900 X |
| 5,109,301 | 4/1992 | Yang ............................ 359/872 |
| 5,151,828 | 9/1992 | Sugimura ........................ 359/871 |

FOREIGN PATENT DOCUMENTS

| | | |
|---|---|---|
| 3022082 | 1/1982 | Fed. Rep. of Germany . |
| 3033143 | 4/1982 | Fed. Rep. of Germany . |
| 2947512A1 | 5/1982 | Fed. Rep. of Germany . |
| 1246937 | 10/1960 | France . |
| 119318 | 10/1918 | United Kingdom . |
| 801099 | 9/1958 | United Kingdom . |
| 1134353 | 11/1968 | United Kingdom . |
| 1199108 | 7/1970 | United Kingdom ............ 248/549 |
| 1224875 | 3/1971 | United Kingdom ............ 248/549 |
| 1256045 | 12/1971 | United Kingdom . |
| 2053112 | 2/1981 | United Kingdom ............ 248/900 |

*Primary Examiner*—J. Franklin Foss
*Attorney, Agent, or Firm*—Price, Heneveld, Cooper, DeWitt & Litton

[57] ABSTRACT

A breakaway accessory mounting assembly for vehicles for supporting rearview mirrors and other accessories includes a base mounted on a vehicle panel surface such as a window, and a coupler engaging the base and having a support mounting the rearview mirror or other accessory. Retaining means such as a wire or stamped metal spring, or a resilient plate extend between the base and coupler and allow installation by slidably receiving the coupler on the base in a lateral direction followed by rotation of the coupler with respect to the base to an installed position about a predetermined first axis without further lateral sliding movement. The retaining means also resiliently hold the base and coupler together in the installed position, and allow release of the coupler from the base in three different separation modes when a predetermined force is imposed on the coupler or supported mirror or other accessory. Positioning means are provided to position the coupler in the installed position on the base.

47 Claims, 5 Drawing Sheets

BREAKAWAY ACCESSORY MOUNTING FOR VEHICLES

BACKGROUND OF THE INVENTION

The present invention relates to releasable mounting systems for vehicle accessories which will release the accessory upon impact to prevent injury and, more particularly, to a breakaway mounting system especially useful with rearview mirrors which is simplified compared to prior assemblies, is more reliable, and provides additional separation modes.

Breakaway rearview mirror mounting systems in which the mirror is released from a supporting structure in the vehicle upon receipt of an impact or during an accident are well-known. Many countries of the world require the use of such breakaway assemblies to meet minimum vehicle standards. However, prior known breakaway systems have often been limited in the impact directions for which release from the vehicle is allowed. For example, some assemblies allow release only when impacted by an object or person within the vehicle moving upwardly and/or toward the windshield upon sudden deceleration and striking the assembly either directly or at an angle during the resulting motion. However, the increased use in vehicles of supplemental vehicle occupant restraint systems, known as air bags, has created additional hazards since the release of one or dual air bags for the driver and/or front seat passenger can often trap the rearview mirror rearwardly of the air bags when mounted in the center of the windshield and prevent proper release of the mirror if struck during an accident. A need therefore exists for breakaway mirror mounting assemblies which can release from multiple directions including that caused by an expanding air bag or bags.

In addition, recent vehicles have included windshields which are more highly inclined from the vertical to reduce wind drag and increase fuel economy. The increased inclination of such windshields when supporting rearview mirror assemblies thereon has also highlighted the need for a breakaway mirror assembly which releases properly in a direction generally parallel to the windshield and toward the instrument panel of the vehicle, i.e., forwardly and downwardly.

Apart from the above, other problems encountered with previously known breakaway rearview mirror assemblies have included the use of a large number of related parts which not only increases manufacturing and inventory costs, but also creates complex assemblies with greater possible failure modes which require more time and are more difficult and complex to assemble and install. Moreover, many of the prior known breakaway assemblies have required the use of tools for installation in a vehicle thereby requiring more highly trained installers and creating additional expense. Further, many prior known breakaway assemblies have included less than adequate retention strength in order to allow easier installation thereby compromising stability during use and creating unwanted vibration which blurs the images visible in the mirror being supported.

Accordingly, the need was apparent for an improved, simplified, breakaway mounting assembly and installation method for rearview mirrors and other accessories which overcomes the above problems.

SUMMARY OF THE INVENTION

Accordingly, the present invention provides a breakaway accessory mounting assembly for vehicles and an installation method therefor which enable the support of rearview mirrors and other accessories in a stable and secure fashion with reduced installation effort and reduced complexity and inventory cost while providing multiple release and separation modes including separation upon impact by forward, rocking or twisting motions.

In one form, the invention is a breakaway accessory mounting assembly for vehicles for supporting rearview mirrors and other accessories including a base for attachment to the surface of a vehicle panel such as a window and a coupler engaging the base. The coupler includes a support for engaging and supporting an accessory, such as a rearview mirror, as well as positioning means for positioning the coupler in an installed position on the base. Retaining means extend between the base and coupler for slidably receiving the coupler on the base in a lateral direction and allowing rotation of the coupler with respect to the base to an installed position about a predetermined first axis without further lateral sliding movement. The retaining means also holds the base and coupler together in the installed position, and allow release of the coupler from the base when a predetermined force is imposed on the coupler.

Preferably, the retaining means include a projection on one of the base and coupler and a resilient, biasing retainer on the other of the base and coupler. In a preferred form, the resilient biasing retainer is mounted on the base, includes a pair of spaced resilient members engaging opposed sides of a projection from the coupler, and an opening between the spaced, resilient members allowing receipt of the projection when the coupler is slidably mounted on the base. In this form, the resilient biasing retainer can be either a generally Y-shaped, wire spring member, or a stamped, sheet metal spring clip.

In addition, stop means are provided for limiting sliding movement between the base and coupler to define the position at which the coupler is rotated to the installed position with respect to the base.

Alternately, the retaining means may include a resilient biasing retainer and a projection on one of the base and coupler and receiving means on the other of the base and coupler for slidably receiving the resilient biasing retainer and projection. In this form, the projection moves the resilient biasing retainer between a first position in which the resilient biasing retainer is slidably and loosely engageable with the receiving means, and a second position in which the resilient, biasing retainer is tightly engaged with the receiving means. In a preferred form of this alternate version of the invention, the biasing retainer and projection are on the coupler with the biasing retainer formed by a plate having outwardly flared, resilient flanges adapted to flex to release the coupler from the base upon impact, the receiving means including a pair of spaced, rigid, inturned flanges engaging the flanges on the plate. The coupler is rotatable with respect to the plate on an axis such that the projection moves the plate from the first to the second positions such that the outwardly flared, resilient flanges are moved from a position loosely engaging the rigid flanges to a position tightly engaging those flanges.

In addition, the invention includes a method for installing an accessory mounting assembly on a panel in a vehicle, the assembly having a base, a coupler for mounting on the base and supporting an accessory, and a resilient retainer for holding the base and coupler together until a predetermined force is imposed on the coupler to release the coupler from the base. The method includes fixing the base to a panel surface, sliding the coupler on a surface of the base in a lateral direction to a first, temporary position, and rotating the coupler with respect to the base into a second, installed position. The coupler is rotated on an axis extending through the first, temporary position without further sliding movement in a lateral direction while a portion of the coupler engages the resilient retainer to urge the coupler and base together.

The present breakaway accessory mounting assembly and installation method provide numerous advantages over prior known assemblies and methods. First, the assembly is a simple, low-cost system having generally three parts thereby reducing manufacturing costs and complexity as well as inventory costs. Secondly, the assembly provides multiple release modes including forward, lateral and/or rearward rocking, and/or twisting release directions such that vehicles having sharply inclined windshields and/or including single or dual air bags can be accommodated. In addition, the assembly allows installation without the use of tools thereby reducing manufacturing labor and cost. Further, the installation method incorporates a twisting motion which provides greater fastening or retainer loading producing greater stability with less vibration for the supported mirror or other accessory during use, while requiring smaller installation effort to obtain and maintain the same stability levels.

These and other objects, advantages, purposes and features of the invention will become more apparent from a study of the following description taken in conjunction with the drawings.

DESCRIPTION OF THE PREFERRED EMBODIMENTS

Figure 1:
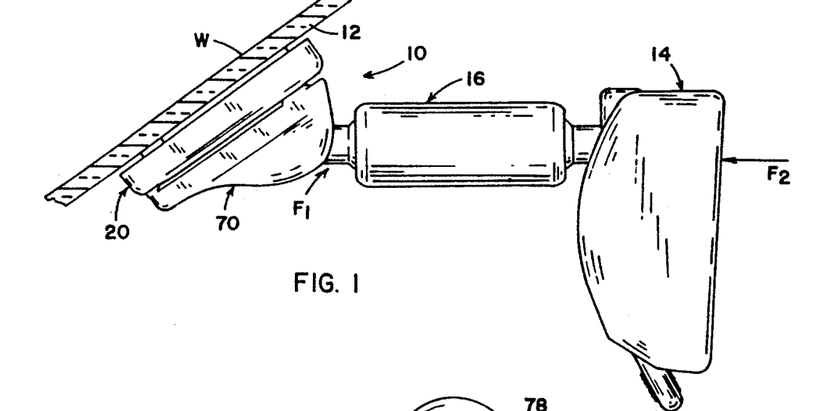
FIG. 1 is a side elevation of a first form of the breakaway mounting assembly illustrating support of a typical rearview mirror from the inside surface of a vehicle windshield.
Figure 2:
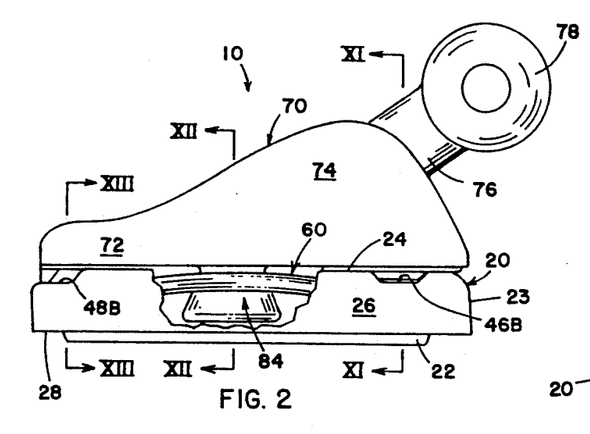
FIG. 2 is a side elevation of the mounting assembly of FIG. 1 with portions broken away.
Figure 3:
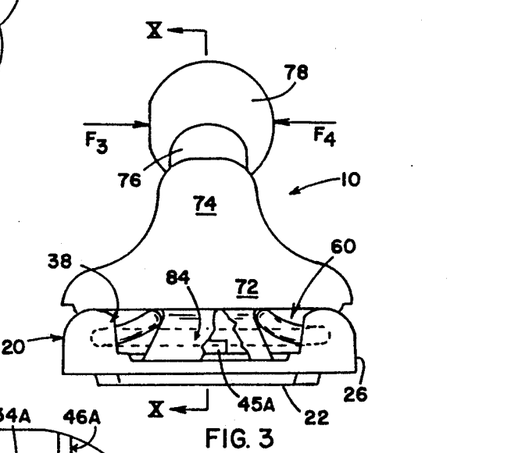
FIG. 3 is a rear elevation of the mounting assembly of FIGS. 1 and 2 with portions broken away.

Referring now to the drawings in greater detail, FIGS. 1–3 generally illustrate the first embodiment 10 of the breakaway accessory mounting assembly for vehicles of the present invention. Mounting assembly 10 is adapted for installation on the inside surface 12 of a typical rearwardly inclined front windshield W of any of numerous trucks, passenger cars or other vehicles. Assembly 10 typically supports an interior rearview mirror assembly 14 via a pivotable or other support arm 16 extending between the mounting assembly 10 and the rearview mirror assembly 14. As referenced in the following description, the rearview mirror assembly 14 and support arm 16 extend rearwardly into the passenger compartment of the vehicle from the windshield area. Mounting assembly 10 is typically positioned centrally on the windshield above the instrument panel thereof. The direction to the left and toward windshield W in FIG. 1 is, therefore, the forward direction, while that to the right and toward the passenger compartment is the rearward direction.

Breakaway mounting assembly 10 has three components including a base 20 adapted for adhesive attachment to the inside surface 12 of windshield W, a coupler 70 adapted for slidable and rotational mounting on base 20 and for engagement with support arm 16 for rearview mirror assembly 14 or another accessory support, and a resilient, biasing retainer or spring member 60 which retains coupler 70 on base 20 but allows release in the various separation modes described herein upon impact from any of several directions.

As is best seen in FIGS. 2–6 and 10–13, base 20 is generally rectangular and die cast from zinc or molded from a suitable resinous polymeric material and includes a generally planar attachment surface 22, an exposed, generally planar, sliding surface 24, and a slightly outwardly flared peripheral surface 26 defining the generally rectangular shape. Attaching surface 22 is slightly offset from the bottom of base 20 forming a shoulder 28 which defines a space receiving excess adhesive which squeezes out from between the attaching surface 22 and the inside surface 12 of windshield W when the base is applied to a vehicle upon installation.

Figure 4:
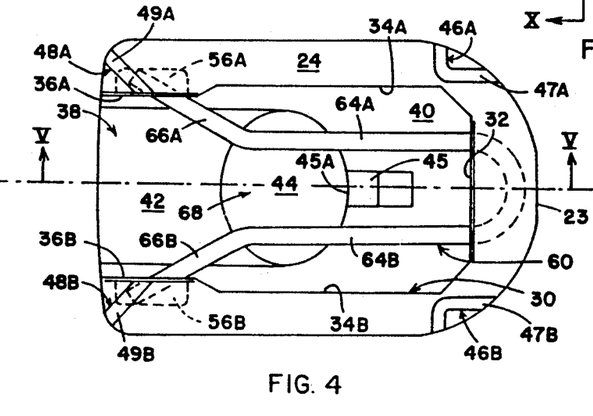
FIG. 4 is a top plan view of the base and one form of the resilient, biasing retainer member mounted on the base.
Figures 5, 6, 7, 8:
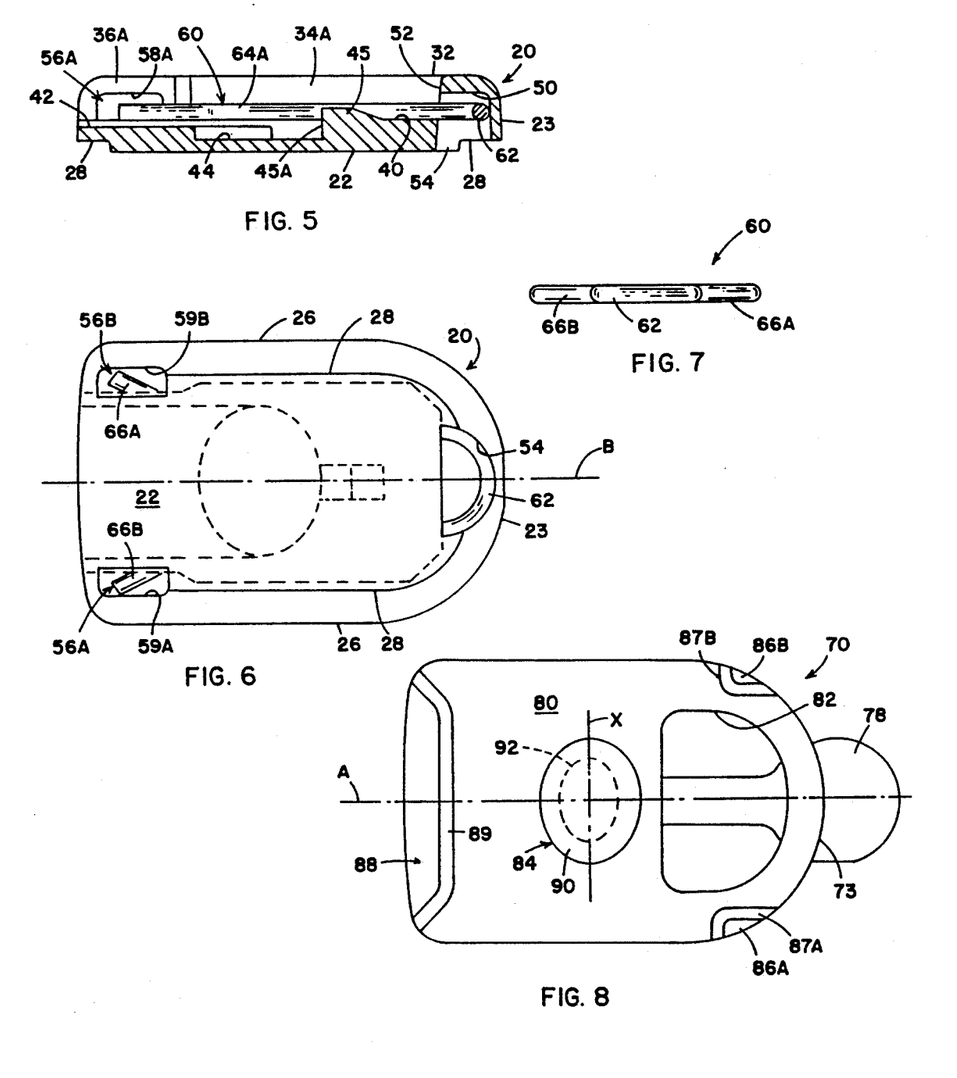
FIG. 5 is a sectional side elevation of the subassembly of FIG. 4 taken along plane V—V of FIG. 4.
FIG. 6 is a bottom plan view of the subassembly of FIGS. 4 and 5.
FIG. 7 is a end elevation of the spring member used in the assembly of FIGS. 1–6.
FIG. 8 is a bottom plan view of the coupler shown in FIGS. 1–3.

Formed within the exposed, planar sliding surface 24 is a generally rectangular recess 30 which receives both the resilient spring member 60 and a tapered retaining projection 84 from coupler 70 when the mounting assembly is installed. Recess 30 opens outwardly through surface 24 and is defined by end wall 32, opposed side walls 34a, 34b, and inwardly offset walls 36a, 36b which define end opening 38 opposite wall 32 to provide access from the exterior into the recess 30. Recess 30 also includes a generally planar bottom surface 40 in which is recessed a rectilinear channel 42 leading to an oval-shaped well 44 recessed below the level of both bottom surface 40 and channel 42 (FIGS. 3, 4, and 5). As explained below, well 44 provides clearance for projection 84 on coupler 70 to allow rotation of the coupler on base 20 as spring member 60 tightens the two parts together during installation. Likewise, channel 42 provides clearance for projection 84 on coupler 70 during sliding movement of the two parts during installation.

Also included in sliding surface 24 of base 20 are four spaced locating recesses 46a, 46b and 48a, 48b. Recesses 46a, 46b and 48a, 48b each include tapered wall surfaces 47a, 47b and 49a, 49b leading from surface 24 to the bottom of each recess. The tapered walls facilitate rotational insertion of corresponding locating projections from coupler 70 as explained below, as well as rotational release of the coupler from the base member upon impact as is also explained below. Recesses 46a, 46b open outwardly toward the periphery 26 of base 20 generally adjacent end wall 32, while recesses 48a, 48b open outwardly of the base and toward opening 38 as shown in FIG. 4.

As shown in FIGS. 3, 4, and 5, bottom surface 40 also includes an upstanding stop 45 having an abutment surface 45a extending generally perpendicular to the bottom of well 44. Stop 45 is positioned centrally in the bottom of recess 30 and is adapted to be centrally located between the resilient retaining arms 64a, 64b of resilient spring member 60 (FIG. 4). For contact with projection 84 during installation.

As is best seen in FIGS. 4-6, mounting recesses for assembling resilient spring 60 are also formed in base 20 and include an end pocket 50, having an opening 52 communicating with recess 30 and an opening 54 communicating with bottom surface 22 and shoulder area 28, and opposed side pockets 56a, 56b which also open inwardly toward recess through openings 58a, 58b in side walls 36a, 36b and outwardly through the bottom surface 22 and shoulder area 28 via openings 59a, 59b.

Spring 60 (FIGS. 2-7) is a generally Y-shaped, one-piece, resilient member preferably formed from zinc plated, music wire having a preferred diameter of approximately 0.08 and including a rounded end 62 joining a pair of parallel retaining arms 64a, 64b each of which terminates in an outwardly flared end 66a, 66b. Resilient arms 64a, 64b define an opening 68 between the points at which inwardly converging spring ends 66a, 66b join arms 64a, 64b as shown in FIG. 4. Opening 68 is adapted to be aligned with stop 45 and well 44 when spring 60 is mounted in base 20 (FIG. 4). When so mounted, end 62 of spring 60 is received in end pocket 50 through opening 52 while the terminal ends 66a, 66b are respectively received in side pockets 56a, 56b through openings 58a, 58b as shown in FIGS. 3-6. Spring 60 is thus securely retained in base 20 but positioned for resilient, bending movement when engaged by projection 84 of coupler 70 as explained below.

Figure 12:
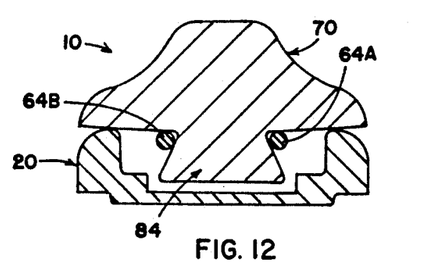
FIG. 12 is a sectional elevation of the assembly taken along plane XII—XII of FIG. 2.
Figure 13:
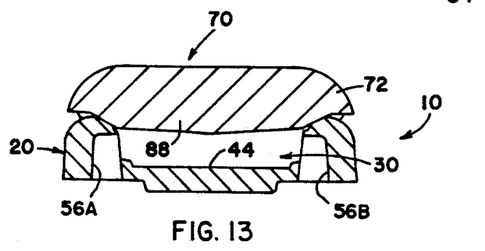
FIG. 13 is a sectional elevation of the assembly taken along plane XIII—XIII of FIG. 2.

As is best seen in FIGS. 2, 3, 8, and 9, coupler 70 is also preferably die cast from zinc, is generally rectangular with a longitudinal axis A, and includes a mounting portion 72 having a shape generally matched to that of the peripheral outline of base 20 and a support portion 74 which flares outwardly from mounting portion 72 to define a rearview mirror or accessory support arm 76 having an integral ball member 78 at the outer, terminal end thereof. Coupler 70 also includes a bottom surface 80, the sides of which are upwardly flared as shown in FIG. 12. Support arm 76 extends at an angle to bottom surface 80 such that arm 76 will be generally horizontal when assembly 10 is mounted on windshield W. Bottom surface 80 includes a weight and material reducing recess 82 formed during the die casting of coupler 70, an outwardly tapered, generally oval or elliptically shaped retaining projection 84, and three spaced, locating projections 86a, 86b and 88. Retaining projection 84 includes a bottom surface 90 which is generally parallel to coupler bottom 80 and outwardly flared side surfaces 92 defining an elongated, elliptical shape in cross section (FIG. 8) such that the area of the section where projection 84 joins coupler bottom 80 is smaller in size than bottom surface 90. Outwardly flared side surfaces 92 are adapted to engage and retain the space resilient spring arm 64a, 64b as explained hereinafter. The axis of elongation X of elliptically shaped projection 84 is positioned transverse to axis A (FIG. 8) and preferably at 90° such that projection 84 will more easily slide between resilient spring arms upon initial, lateral sliding movement of coupler 70 on base 20 as explained below. Thereafter, rotation of coupler 70 separates and bows spring arms 64 upwardly to create the maximum retaining force such that axis X of projection 84 is positioned transverse to the longitudinal axis of the spring in the final, assembled position shown in FIGS. 2, 3, 10 and 12.

Locating projections 86a, 86b and 88 generally correspond in shape to locating recesses 46a, 46b, 48a and 48b although projection 88 is adapted to extend across and between both recesses 48a and 48b simultaneously. These projections include tapered walls 87a, 87b and 89 (FIG. 8) which act as cam surfaces to help coupler 70 twist and rotate upon impact thereby facilitating release of the assembly.

Figures 9, 10:
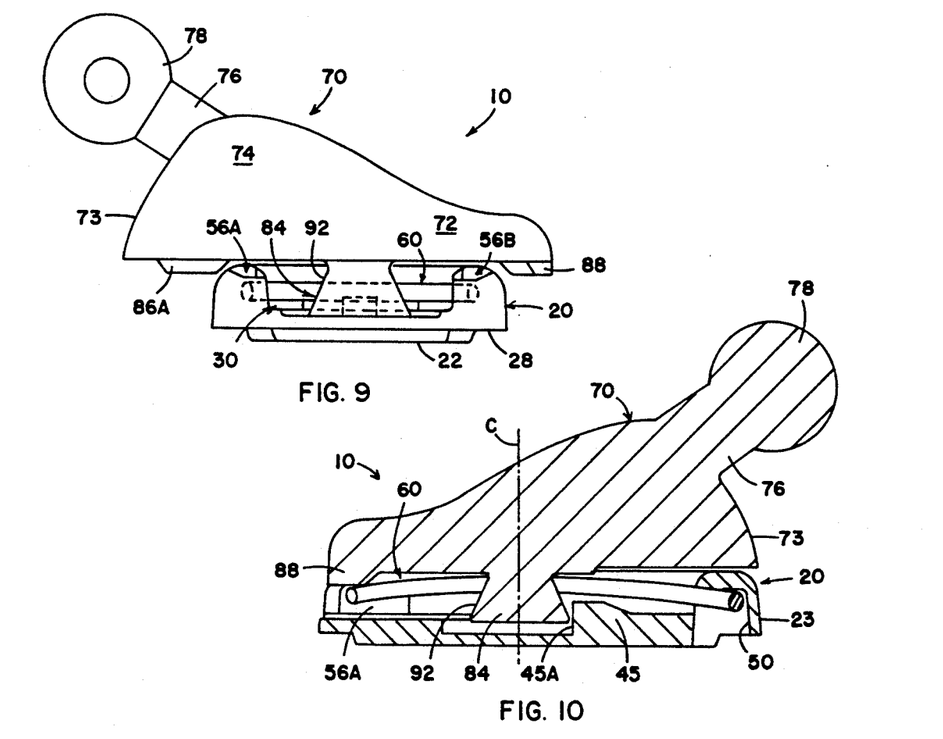
FIG. 9 is an elevational view of the coupler partially installed on the base and shown it its first, temporary position.
FIG. 10 is a sectional side elevation of the assembly showing the coupler rotated to its second, installed position and taken along plane X—X of FIG. 3.
Figure 11:
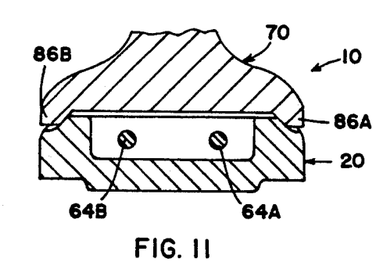
FIG. 11 is a fragmentary, sectional end elevation of the assembly taken along plane XI—XI of FIG. 2.

Referring now to FIGS. 2, 3, and 9-13, assembly and installation of mounting assembly 10 will be understood. Initially, base 20 is secured to inside surface 12 of glass windshield W via a suitable adhesive such as black urethane, available from Morton-Yokohama, of USA-Japan. Either prior or subsequent to the mounting of base 20 to windshield W, spring member 60 is inserted and mounted on the base member in pockets 50, 56a and 56b in the manner described above. Thereafter, as shown in FIG. 9, coupler 70 is positioned with its longitudinal axis A (FIG. 8) at approximately 90° to the longitudinal axis B of base 20 (FIG. 4 and 6). Axis X of projection 84 is aligned with opening 38 to recess 30 in base 20 and with opening 68 between spring arms 64a, 64b. Coupler 70 is then moved laterally such that its bottom surface 80 in the area intermediate locating projections 86a, 86b and projection 84 and the area between locating projection 88 and projection 84 contact the exposed slide surface 24 of base 20. Projection 84 passes through opening 38, into recess 30 and through opening 68 as coupler 70 is moved toward end wall 32. Spring ends 66a, 66b help funnel and direct projection 84 into opening 68 to speed installation in the event coupler 70 is slightly misaligned with base 20.

Initially, spring 60 is in its relaxed, unbiased, generally planar position as shown in FIGS. 5, 7, and 9. Continued sliding movement of coupler 70 in the lateral direction brings the lower edge of projection 84 into engagement with abutment surface 45a of stop 45 as shown in FIGS. 9 and 10. During such movement, side surfaces 92 of projection 84 engage the inner surfaces of the resilient spring arms 64a, 64b and bow the arms upwardly because of the upwardly converging peripheral side surfaces as shown in FIG. 10. When projection 84 engages stop 45, coupler 70 is in its temporary position on base 20 with spring 60 pulling coupler 70 toward base 20 via projection 84.

Next, coupler 70 is manually rotated, about axis C typically in a clock-wise direction, while projection 84 remains in contact with abutment surface 45a (FIG. 10) without any further lateral sliding movement of the coupler on the base member. Axis C is preferably perpendicular to the direction of lateral sliding movement between the base and coupler such that coupler 70 rotates in a plane generally parallel to the plane of base 20 and surface 24. Such rotation brings projections 86a and 88 into contact with opposite side surfaces of base 20 with inclined surfaces 87a and 89 allowing coupler 70 to be cammed upwardly and over the exposed slide surface 24 while spring member 60 biases coupler 70 toward base 20 until end 73 of coupler 70 is brought into registry with end 23 of base 20 in the final or assembled position of the mounting assembly.

In the final, installed position, the spring arms 64a, 64b are upwardly bowed to their maximum extent as shown in FIGS. 10 and 12. Such bowing creates a force pulling coupler 70 toward base 20 and maintaining the two parts registered and in alignment with one another until an impact force overcomes the spring force to separate the two. Separation or release will occur regardless of whether the impact force is from the side of the accessory or mounting assembly in the direction of force arrows $F_3$ or $F_4$ (FIG. 3) causing a-rotational movement substantially the reverse of that used to install coupler 70 on base 20, or in a rocking direction from the instrument panel toward the roof of the vehicle shown by arrow $F_1$ in FIG. 1 such as that caused by the expansion of air bags within the vehicle or an upward force by an object within the vehicle, or by a force $F_2$ directly axially along the support arm 76 or from above the mounting assembly 10 such that the coupler 70 is forced downwardly in a direction substantially parallel to windshield W. In this regard, separation downwardly toward the instrument panel of the vehicle is allowed through opening 68 between arms 64a, 64b and opening 38 between side walls 36a, 36b in the event the impact force is sufficient to cam projections 86a, 86b out of locating recesses 46a, 46b against the resistance of the spring arms acting on projection 84.

In addition, in the assembled position, locating projections 86a, 86b engage locating recesses 46a, 46b, respectively, and projection 88 engage both locating recesses 48a, 48b while bottom 80 of coupler 70 is spaced slightly away from slide surface 24 of base 20. The engaged projections and recesses resist minor twisting motions and keep the base and coupler aligned in the installed position until a twisting impact of a predetermined magnitude acting on support arm 76 in the direction of arrows $F_3$ or $F_4$ (FIG. 3) or through the supported accessory or mirror 14 and support arm 16, as mentioned above, creates enough twisting separation force to overcome the resistance of the projections of the recesses and either cam the two apart and rotate the coupler to its temporary position or separate the coupler from the base. Accordingly, separation and release based on at least three different force directions within the vehicle including lateral twisting, upward or rearward rocking, and forward and downward sliding are accommodated by the present mounting assembly.

A second embodiment 100 of the breakaway accessory mounting assembly of the present invention is shown in FIGS. 14-19 where like numerals indicate like parts to those described above. Assembly 100 incorporates a base 20' similar to base 20, a coupler 70 identical to the coupler in assembly 10, and a modified sheet metal spring clip 102 mounted on base 20' for resiliently and releasably biasing coupler 70 against base 20'.

As shown best in FIGS. 14, 15, 18, and 19, base 20' is substantially similar to base 20 except that it does not include a stop member 45. Base 20' is also preferably die cast from zinc and is substantially rectangular including bottom surface 22', closed end 23', peripheral sides 26', exposed sliding surface 24', interior recess 30', and opening 38' leading to recess 30'. Recess 30' includes bottom surface 40', recessed channel 42', and recessed well 44', all of which are similar to those in base 20 In addition, locating projections 46a', 46b' and 48a', 48b' are located similar to those in base 20. Further, recessed pockets 50', 56a' and 56b' are provided in similar locations to those in base 20 for receiving and mounting the spring clip member 102. Pockets 50', 56a', and 56b' open inwardly to recess 30', as well as downwardly or outwardly to the bottom surface 22' of base 20'.

The major difference between assemblies 10 and 100 is the use of a stamped, sheet metal spring clip 102, best seen in FIGS. 14-17. Spring clip 102 is generally rectangular, but has a dished, concave shape (FIGS. 15 and 17) and includes a tapered nose or end 104 adapted to fit within recessed pocket 50', opposite end 106 adapted to extend across opening 38', and outwardly extending corners 108a, 108b adapted to fit within recessed pockets 58a' and 58b'. End 106 also includes downwardly extending, bent flange 110 which helps cam projection 84 into and through opening 38' during installation as explained hereinafter. In addition, spring clip 102 includes opposed, longitudinally extending, resilient spring arms 112a, 112b extending between ends 104 and 106 on opposite sides of the spring member. The ends of the spring arms 112a, 112b adjacent end 106 include upwardly bent flanges 113a, 113b which also act as cam surfaces to direct projection 84 from coupler 70 into and through the opening between the resilient spring arms. In addition, a stop member 114 extends between arms 112a, 112b from end 104 and includes an upwardly bent abutment flange 116 for engaging projection 84 in its temporary position during installation and prior to rotation during its final aligned position. In addition, shoulders 105a, 105b near tapered end 104 are adapted to engage the inside wall surfaces of recess 30' to laterally position the spring clip 102 when installed in base 20'.

Figures 14, 15, 16, 17, 18:
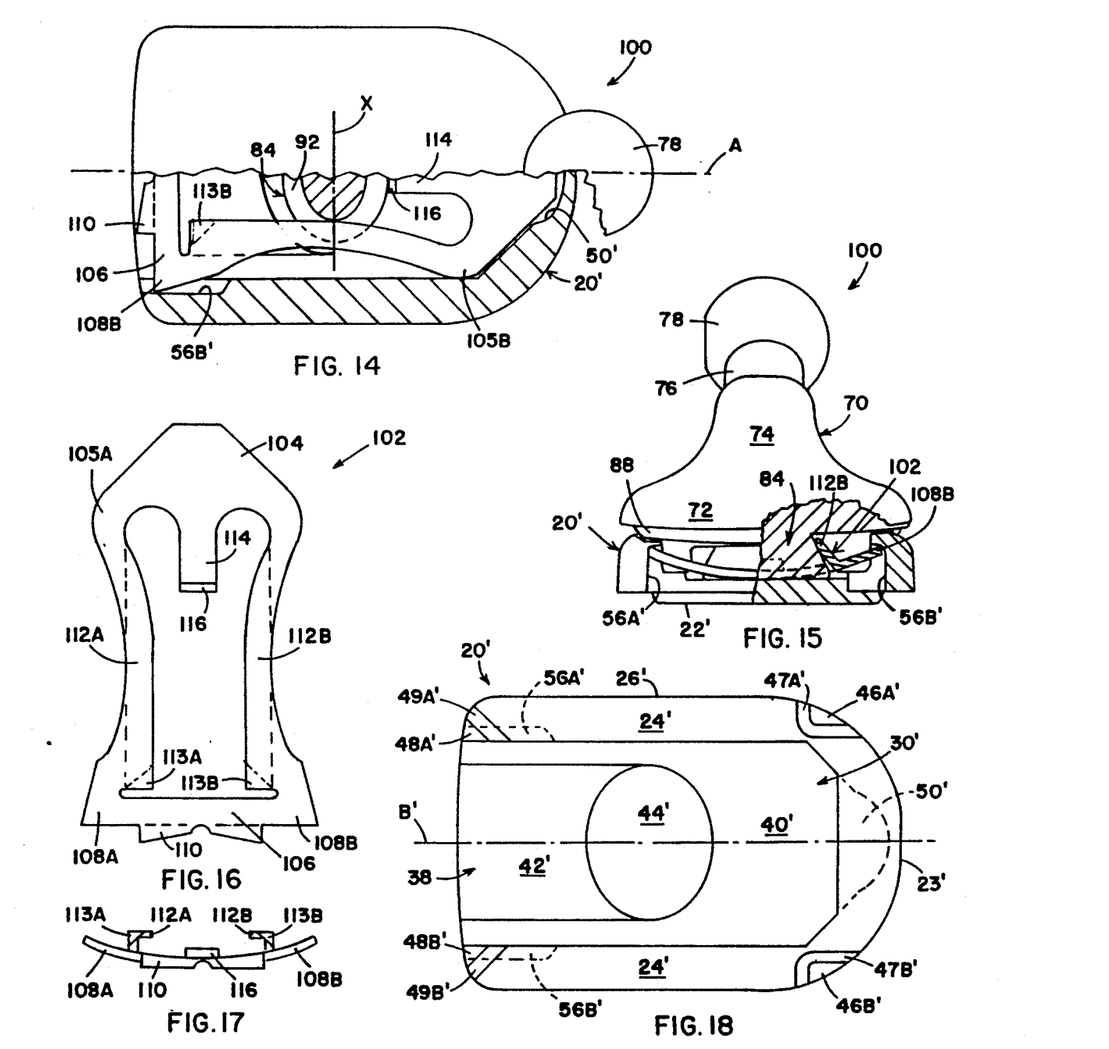
FIG. 14 is a plan view, with portions broken away of a second embodiment of the breakaway accessory mounting assembly of the present invention.
FIG. 15 is an end elevation of the assembly of FIG. 14 with portions broken away.
FIG. 16 is a plan view of the stamped, sheet metal, spring clip member used in the assembly of FIGS. 14 and 15.
FIG. 17 is an end elevation of the spring member of FIG. 16.
FIG. 18 is a top plan view of the base member of the embodiment of the assembly shown in FIGS. 14 and 15.
Figure 19:
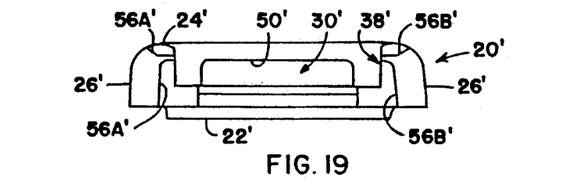
FIG. 19 is an end elevation of the base member of FIG. 18.

For installation and use, embodiment 100 is similar to embodiment 10 in that spring clip 102 is first positioned in base 20' by inserting nose or end 104 in pocket 50' followed by fitting corners 108a, 108b in pockets 56a' and 56b', respectively. Thereafter, with the longitudinal axis A of coupler 70 positioned at 90° to the longitudinal axis B' of base 20', coupler 70 is slidably inserted on base 20' such that bottom 80 engages exposed slide surface 24' and the longitudinal axis X of projection 84 slips between spaced spring arms 112a, 112b as guided by flanges 110, 113a, and 113b. Spring clip 102 moves from its relaxed, unbiased position prior to such sliding insertion, to a partially biased, tensioned position as coupler 70 is moved toward and into contact with abutment surface 116. Thereafter, coupler 70 is rotated, typically clockwise through 90°, such that axis A is brought into registry with axis B' of base 20' (FIG. 18) while elongated projection 84 spreads and lifts opposed spring arms 112a, 112b and tensions those spring arms into their final, fully biased positions all while projection 84 remains adjacent abutment 116 without further lateral sliding movement of coupler 70. When positioned as shown in FIGS. 14 and 15, spring arms 112a, 112b engage peripheral sides 92 of projection 84, locating projections 86a, 86b and 88 are engaged and seated within locating recesses 46a', 46b' and 48a', 48b' and the coupler and base are drawn together via the resiliency of spring clip 102. However, should the accessory or rearview mirror mounted on ball 78 and support arm 76 receive an impact force in an upward or rearward rocking direction along the direction of force $F_1$ in FIG. 1, head on along the direction of force $F_2$ in FIG. 1, or laterally twisting or from the direction of the windshield via the air bag or other object, the assembly 100 will release and separate in a rocking fashion, forwardly and downwardly along the windshield, or in a twisting motion to prevent injury. As in assembly 10, such release is aided by the camming surfaces 47a', 47b' and 49a', 49b' engaging the inclined surfaces of the locating projections on coupler 70. In such event, the spring arms 112a, 112b will slide downwardly and be spread apart by the outwardly moving projection 84 on coupler 70 while the spring clip is retained on base member 20' via the recessed pockets.

A third embodiment 150 of the breakaway accessory mounting assembly for vehicles is shown in FIGS. 20-24. Assembly 150 includes modified base, coupler, and resilient spring member parts although its assembly and installation method is similar to assemblies 10 and 100 by including sliding insertion followed by rotation of the coupler to a final, tightened, installed position. As shown in FIGS. 20-22 and 24, assembly 150 includes a base 152 adapted for adhesive attachment to the inside surface 12 of windshield W, a coupler 170 including a support arm 172 and ball member 174 and a resilient, double tapered spring member or plate 190 rotationally mounted on bottom 176 of coupler 170.

Figures 20, 21, 22, 23, 24:
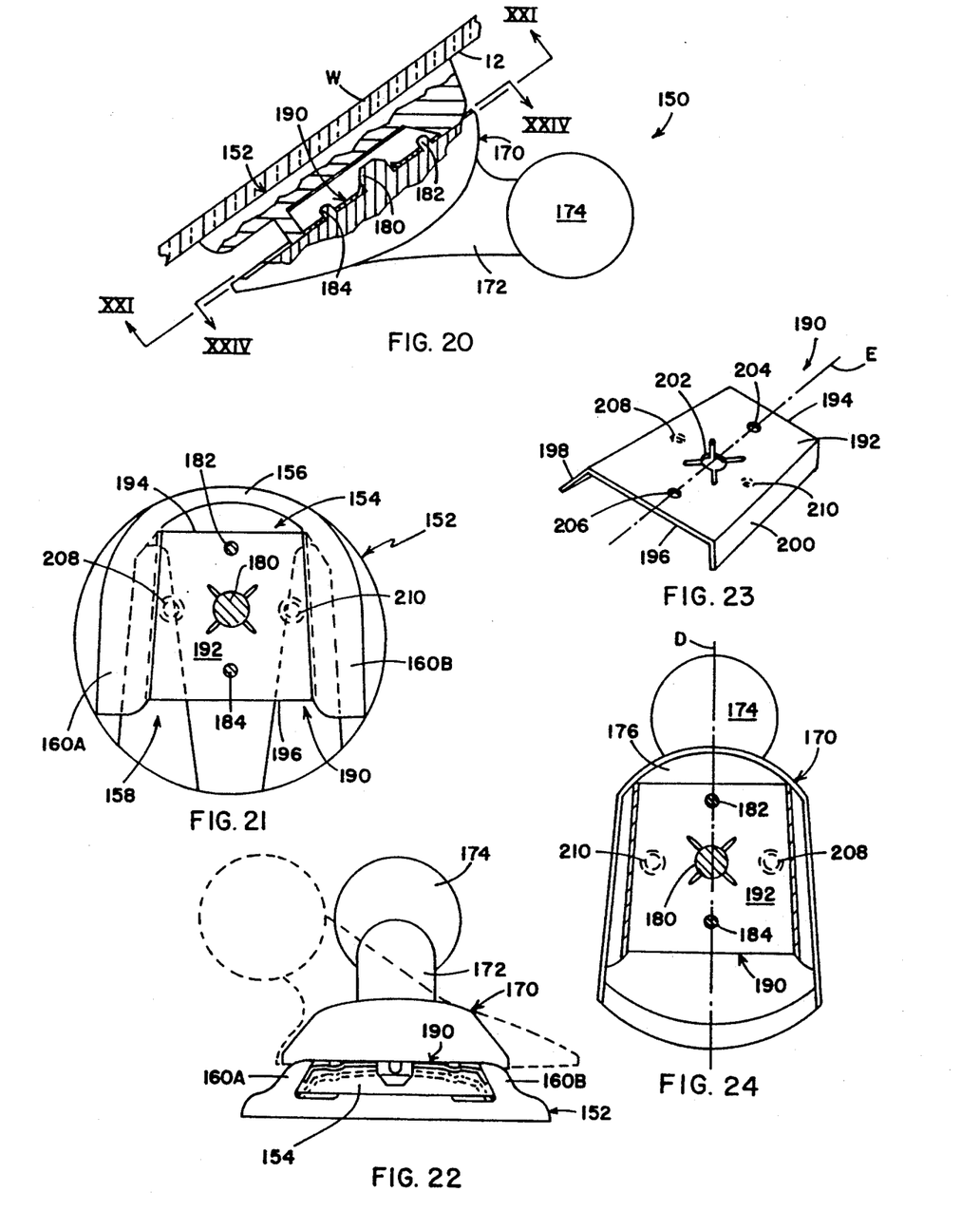
FIG. 20 is a side elevation, with portions broken away, of a third embodiment of the breakaway accessory mounting assembly of the present invention.
FIG. 21 is a sectional plan view of the base and resilient biasing retainer taken along plane XXI—XXI of FIG. 20.
FIG. 22 is an end elevation of the assembly of FIG. 20 showing rotation of the coupler from its temporary to its installed position.
FIG. 23 is a perspective view of the resilient biasing retainer plate used in the assemblies of FIGS. 20 and 22.
FIG. 24 is a bottom plan view of the coupler and resilient biasing plate taken along plane XXIV—XXIV of FIG. 20.

Base member 152 has a generally circular configuration defining a central recess 154 having a semi-circular, closed end 156, opposed open end 158 adapted to open forwardly and downwardly along windshield W, and a pair of opposed, rigid, inclined flanges 160a, 160b. Flanges 160a, 160b are inclined toward one another when viewed from opening 158 (FIG. 22) and converge toward the closed end 156 of base 152 from opening 158 as shown in FIG. 21. As such, flanges 160a, 160b form a double-tapered, closed ended recess or slot adapted to receive double-tapered spring member 190 as explained hereinafter.

The bottom of coupler 170 is slightly recessed as shown at 176 in FIGS. 20 and 22 so as to properly register with the top surfaces of rigid flanges 160a, 160b in the final, installed position as shown in FIG. 22. In addition, bottom 178 includes a central, cylindrical projection or pin 180 and a pair of smaller cylindrical projections 182, 184 spaced equidistantly outwardly from pin 180. Both projections 182, 184 are aligned with pin 180 along longitudinal axis D of coupler 170. Pin 180 is adapted to rotationally receive resilient spring member or plate 190, while projections 182, 184 engage and flex the spring plate as coupler 170 is rotated from its temporary to its final position as explained hereinafter.

As best seen in FIGS. 22 and 23, spring plate 190 is preferably formed from spring steel and includes a base 192 having a shorter, upper end 194, a longer, lower end 196 and a pair of outwardly extending, resilient spring flanges 198, 200. Flanges 200 are flared outwardly from the edges of base 192 and converge toward one another as they progress toward upper end 194 as shown in FIG. 23. In addition, base 192 includes a central aperture 202, and two spaced apertures 204, 206 aligned with aperture 202 along the longitudinal axis E of spring plate 190 (FIG. 23). Further, a pair of spaced dimples or depressions 208, 210 are positioned on either lateral side of aperture 202 along an axis which is spaced at 90° from longitudinal axis E on which apertures 204, 206 are positioned.

To install and use assembly 150, spring plate 190 is first positioned on pin 180 by inserting pin 180 through aperture 202 such that the top surface of spring plate base 192 is adjacent the bottom 178 of coupler 170. The resilient flanges defining aperture 202 on plate 190 clamp pin 180 but allow rotation about the pin. When finally assembled, longitudinal axis E of spring plate 190 will be aligned with longitudinal axis D of coupler 170 such that projections 182, 184 extend through apertures 204, 206 (FIG. 20).

Thereafter, coupler 170 is rotated counterclockwise with respect to spring plate 190 such that projections 182, 184 engage and are in registry with dimples 208, 210 which causes the flanges 198, 200 to be flexed downwardly via resilient base 192 from bottom 176 of coupler 170 while aperture 202 remains on pin 180 as shown in phantom in FIG. 22.

Next, coupler 170 is slid laterally such that top end 194 of spring plate 190 enters opening 158 between rigid flanges 160a, 160b. The sliding motion is continued until end 194 engages portions of the closed end 156 of base 152 which is the temporary installed position of assembly 150. Sliding motion is allowed since the flanges 198, 200 are flexed downwardly and away from the inside surfaces of rigid flanges 160a, 160b such that a loose relationship between the spring plate 190 and the rigid flanges is maintained.

To move the assembly 150 to its final assembled position, coupler 170 is rotated clockwise through 90° such that axis D of coupler 170 is brought into registry with longitudinal axis E of spring plate 190. Projections 182, 184 leave dimples 208, 210 allowing the spring plate to flex back to its normal position with flanges 198, 200 tightly engaging the inside surfaces of inturned rigid flanges 160a, 160b when projections 182, 184 register with apertures 204, 206 and project therethrough. At such position, projections 182, 184 cause no flexing of spring plate 190 and flanges 198, 200 are fully engaged with rigid flanges 160a, 160b to bias coupler 170 toward base 152 and hold the two tightly together until an impact force causes separation thereof. As with embodiments 10 and 100, separation can occur through three different types of impact forces, namely, rocking, twisting or forward and downward. For the rocking or twisting motion, resilient flanges 198, 200 will flex and pass between the upper edges of rigid flanges 160a, 160b upon receipt of a sufficient force. Likewise, if a force in the direction of $F_2$ in FIG. 1 is received, spring plate 190 will be forced downwardly and forwardly through opening 158 to allow separation between the coupler and base.

As will now De apparent, each of the embodiments 10, 100, and 150 are assembled by lateral sliding movement of the coupler and base with respect to one another until a temporary position is obtained after which the coupler and base are rotated with respect to one another to cause tight, secure, resilient retention via an intermediate spring member on either one or the other of the base or coupler. Rotation occurs without further lateral sliding movement of either member. Moreover, separation and release upon impact or expansion of air bags within a vehicle can occur in each assembly with respect to rocking, twisting or forward and downward separation modes.

Other variations of these assemblies are possible, including molding base 20 or 20' integrally and in one piece with resilient spring arms forming an equivalent biasing retainer to spring 60 or 102. Likewise, other materials, such as resinous, polymeric materials, could be used for the base and coupler.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A breakaway accessory mounting assembly for vehicles for supporting rearview mirrors and other accessories comprising:
   a base for attachment to a surface of a vehicle panel such as a window;
   a coupler engaging said base and including a support for engaging and supporting an accessory such as a rearview mirror, and positioning means for positioning said coupler in an installed position on said base; and
   retaining means extending between said base and coupler for slidably receiving said coupler on said base in a lateral direction and allowing rotation of said coupler with respect to said base to said installed position about a predetermined first axis without further lateral sliding movement, for resiliently holding said base and coupler together in said installed position, and for releasing said coupler from said base when a predetermined force is imposed on said coupler.

2. The assembly of claim 1 wherein said retaining means include a projection on one of said base and coupler, and a resilient, biasing retainer on the other of said base and coupler, said resilient, biasing retainer including means for slidably receiving and allowing rotation of said projection when said coupler is received on said base.

3. The assembly of claim 2 wherein said resilient, biasing retainer includes a pair of spaced resilient members for engaging opposed sides of said projection; said means for slidably receiving said projection including an opening between said spaced resilient members.

4. The assembly of claim 3 wherein said resilient, biasing retainer is a generally Y-shaped spring member.

5. The assembly of claim 3 wherein said resilient, biasing retainer is a stamped, sheet metal spring clip.

6. The assembly of claim 3 wherein said resilient, biasing retainer is mounted on said base and said projection extends from said coupler.

7. The assembly of claim 3 wherein said projection is a tapered member joined to said one of said base and coupler and having a free end larger than the area at which said projection joins said one of said base and coupler.

8. The assembly of claim 7 wherein said one of said base and coupler is elongated in a predetermined direction; said tapered projection member being elliptical in cross section when viewed generally perpendicular to said lateral direction, and having an axis of elongation positioned transverse to said predetermined direction of said one of said base and coupler.

9. The assembly of claim 3 wherein said other of said base and coupler includes a recess in which said resilient, biasing retainer is mounted; said recess including an opening aligned with said opening between said spaced resilient members to allow said projection to be slidably received therebetween.

10. The assembly of claim 2 including a stop means for limiting sliding movement between said base and coupler and defining the position at which said coupler is rotated to said installed position with respect to said base.

11. The assembly of claim 10 wherein said resilient, biasing retainer is on said base; said stop means being an abutment surface on one of said resilient, biasing retainer and said base; said projection being on said coupler and adapted to engage said abutment surface prior to rotation to said installed position.

12. The assembly of claim 11 wherein said abutment surface is on said base.

13. The assembly of claim 11 wherein said abutment surface is on said resilient, biasing retainer.

14. The assembly of claim 2 wherein said one of said base and coupler is said coupler and other of said base and coupler is said base; said base including a recess in which said resilient, biasing retainer is mounted, an exposed surface for slidably engaging said coupler, and a mounting surface for attaching said base to the vehicle panel surface; said coupler including said projection extending outwardly from a slide surface, said slide surface adapted to slidably engage said exposed surface of said base; said projection being received within said base recess when received by said resilient, biasing retainer.

15. The assembly of claim 14 wherein said positioning means includes at least one locating recess in said exposed surface of said base, and a locating projection on said slide surface of said coupler, said locating projection adapted to mate with and be received in said locating recess when said coupler is in said installed position on said base.

16. The assembly of claim 15 including four of said locating recesses in said exposed base surface; said coupler including three of said locator projections on said slide surface; one of said locating projections adapted to engage two of said locating recesses.

17. The assembly of claim 1 wherein said predetermined first axis is generally perpendicular to said lateral direction.

18. The assembly of claim 1 including a stop means for limiting sliding movement between said base and coupler and defining the position at which said coupler is rotated to said installed position with respect to said base.

19. The assembly of claim 18 wherein said retaining means includes a resilient, biasing retainer and at least one projection on one of said base and coupler, and receiving means on the other of said base and coupler for slidably receiving said resilient, biasing retainer and projection, said projection adapted to move said resilient, biasing retainer between a first position in which said resilient, biasing retainer is slidably and loosely engageable with said receiving means, and a second position in which said resilient, biasing retainer is tightly engaged with said receiving means.

20. The assembly of claim 19 wherein said resilient, biasing retainer and projection are on said coupler; said receiving means being on said base and including an abutment for stopping slidable movement of said resilient, biasing retainer with respect to said receiving means.

21. The assembly of claim 20 wherein said coupler includes means for rotatably mounting said resilient, biasing retainer on a second axis; said projection being spaced from said second axis; said resilient, biasing retainer including an aperture for receiving said projection in said second position of said resilient, biasing retainer in which said coupler is in said installed position.

22. The assembly of claim 21 wherein said resilient, biasing retainer is a plate formed from resilient material and having outwardly flared, resilient flanges adapted to flex to release said coupler from said base upon impact; said receiving means including a pair of spaced, rigid, inturned flanges engaging said resilient, outwardly flared flanges on said plate; said coupler being rotatable with respect to said plate on said second axis such that said projection moves said plate from said first to said second position whereby said outwardly flared, resilient flanges are moved from a position loosely engaging said rigid flanges to a position tightly engaging said rigid flanges to releasably hold said coupler on said base; said second axis corresponding to said first axis when said abutment engages said resilient, biasing retainer.

23. The assembly of claim 22 wherein said base includes a recess defining said rigid, inturned flanges and said abutment; said coupler including a pair of said projections spaced on either side of a pin defining said second axis and on which said resilient plate is mounted; said plate including a pair of spaced apertures, each aperture adapted to receive one of said projections when said coupler is rotated to said installed position after said plate is slidably received in said base recess and engaged with said abutment.

24. A breakaway accessory mounting assembly for vehicles for supporting rearview mirrors and other accessories comprising:
   a base adapted for attachment to a surface of a vehicle panel such as a window;
   a coupler engaging said base, being rotatable between a temporary and-installed positions, and including a support for engaging and supporting an accessory such as a rearview mirror, a retaining member, and at least one positioning member for positioning said coupler in said installed position on said base; and
   a resilient, biasing retainer on said base, said biasing retainer being movable between at least a relaxed, a first biased, and a second biased position and having an opening for slidably receiving said coupler retaining member and adapted to release said coupler from said base in at least one of several directions upon receipt of a predetermined force on said coupler, said biasing retainer slidably receiving said retaining member in said relaxed position and allowing movement of said retaining member to position said coupler in said temporary position with said biasing retainer in said first biased position, said biasing retainer being movable to said second biased position when said coupler is rotated to said installed position whereby said base and coupler are urged together by said biasing retainer until a predetermined force is imposed on said coupler such that said coupler is released from said base.

25. The assembly of claim 24 wherein said resilient, biasing retainer includes a pair of spaced resilient members for engaging opposed sides of said retaining member.

26. The assembly of claim 25 wherein said resilient, biasing retainer is a generally Y-shaped spring member.

27. The assembly of claim 25 wherein said resilient, biasing retainer is a stamped, sheet metal spring clip.

28. The assembly of claim 25 wherein said retaining member is a tapered projection joined to said coupler and having a free end larger than the area at which said projection joins said coupler, said tapered projection being elongated and adapted to flex said spaced resilient member as said coupler is rotated to said installed position.

29. The assembly of claim 24 wherein said base includes a recess in which said resilient, biasing retainer is mounted, an exposed surface for slidably engaging said coupler, and a mounting surface for attaching said base to the vehicle panel surface; said coupler retaining member being a projection; said coupler including said projection extending outwardly from a slide surface, said slide surface adapted to slidably engage said exposed surface of said base; said projection being received within said base recess when received by said resilient, biasing retainer.

30. The assembly of claim 29 wherein said positioning means includes at least one locating recess in said exposed surface of said base, and a locating projection on said slide surface of said coupler, said locating projection adapted to mate with and be received in said locating recess when said coupler is in said installed position on said base.

31. The assembly of claim 29 wherein said base includes an opening aligned with said opening between said spaced resilient members to allow said projection to be slidably received therebetween.

32. The assembly of claim 24 including a stop means for limiting sliding movement between said base and coupler and defining the position at which said coupler is rotated to said installed position with respect to said base.

33. The assembly of claim 24 wherein said positioning means includes at least one locating recess in a surface of said base, and a locating projection on a mating surface of said coupler, said locating projection adapted to mate with and be received in said locating recess when said coupler is in said installed position on said base.

34. The assembly of claim 24 wherein said coupler is rotatable on a predetermined axis which is generally perpendicular to a lateral direction in which said coupler is slidably received on said base.

35. A breakaway accessory mounting assembly for vehicles for supporting rearview mirrors and other accessories comprising:
a base for attachment to a surface of a vehicle panel such as a window;
a coupler engaging said base and including a support for engaging and supporting an accessory such as a rearview mirror, and positioning means for positioning said coupler in an installed position on said base;
said base and coupler being rotatable with respect to one another on a first axis between temporary and installed positions;
a resilient, biasing retainer and at least one projection on one of said base and coupler, and receiving means on the other of said base and coupler for slidably receiving said resilient, biasing retainer and projection, said projection adapted to move said resilient, biasing retainer between a first position in which said resilient, biasing retainer is slidably and loosely engageable with said receiving means in said temporary position, and a second position in which said resilient, biasing retainer is tightly engaged with said receiving means in said installed position; said coupler being releasable from said base upon impact such that said resilient, biasing retainer releases from said receiving means in said installed position.

36. The assembly of claim 35 wherein said resilient, biasing retainer and projection are on said coupler; said receiving means being on said base and including an abutment for stopping slidable movement of said resilient, biasing retainer with respect to said receiving means.

37. The assembly of claim 36 wherein said coupler includes means for rotatably mounting said resilient, biasing retainer on a second axis; said projection spaced from said second axis; said resilient, biasing retainer including an aperture for receiving said projection in said second position of said resilient, biasing retainer in which said coupler is in said installed position.

38. The assembly of claim 37 wherein said resilient, biasing retainer is a plate formed from resilient material and having outwardly flared, resilient flanges adapted to flex to release said coupler from said base upon impact; said receiving means including a pair of spaced, rigid, inturned flanges engaging said resilient, outwardly flared flanges on said plate; said coupler being rotatable with respect to said plate on said second axis such that said projection moves said plate from said first to said second position whereby said outwardly flared, resilient flanges are moved from a position loosely engaging said rigid flanges to a position tightly engaging said rigid flanges to releasably hold said coupler on said base; said second axis corresponding to said first axis when said abutment engages said resilient, biasing retainer.

39. The assembly of claim 38 wherein said base includes a recess defining said rigid, inturned flanges and said abutment; said coupler including a pair of said projections spaced on either side of a pin defining said second axis and on which said resilient plate is mounted; said plate including a pair of spaced apertures, each aperture adapted to receive one of said projections when said coupler is rotated to said installed position after said plate is slidably received in said base recess and engaged with said abutment.

40. A method for installing an accessory mounting assembly, on a panel in a vehicle, the assembly having a base, a coupler for mounting on the base and supporting an accessory, and a resilient retainer for holding the base and coupler together until a predetermined force is imposed on the coupler to release the coupler from the base, said method comprising:
affixing the base to a panel surface;
sliding the coupler on a surface of the base in a lateral direction to a first, temporary position; and
rotating the coupler with respect to the base into a second, installed position on an axis extending through said first, temporary position without further sliding movement in the lateral direction while a portion of the coupler engages the resilient retainer and the resilient retainer urges the coupler and base together.

41. The method of claim 40 including sliding the coupler on the base until a projection on one of the base and coupler engages an abutment on the other of the base and coupler when the coupler is in said first, temporary position.

42. The method of claim 41 including engaging a locating projection on one of the base and coupler with a locating recess on the other of the base and coupler to position the coupler in said second, installed position.

43. The method of claim 41 including engaging the projection with the resilient retainer to bend the resilient retainer and urge the base and coupler together.

44. The method of claim 43 wherein the projection is on the coupler, said method including rotating the projection with the coupler while the projection contacts the resilient retainer as said coupler is moved from said first, temporary position to said second, installed position.

45. The method of claim 41 including disengaging the projection from the resilient retainer to release the resilient retainer from a bent position and thereby urge the base and coupler together.

46. The method of claim 45 including rotating the projection into an aperture in the resilient retainer to release the retainer.

47. The method of claim 41 wherein said projection on one of said base and coupler is elongated in one dimension, said rotating said coupler including flexing said resilient retainer with said projection as said elongated dimension is rotated.

* * * * *

UNITED STATES PATENT AND TRADEMARK OFFICE
CERTIFICATE OF CORRECTION

PATENT NO. : 5,330,149
DATED : July 19, 1994
INVENTOR(S) : Theodore M. Haan et al.

It is certified that error appears in the above-indentified patent and that said Letters Patent is hereby corrected as shown below:

Column 5, line 57
  Page 11, line 3;
    After "recess" insert —30—.

Column 5, line 63
  Page 11, line 9;
    After "0.08" insert —inches—.

Column 7, line 48
  Page 15, line 1;
    "a-rotational" should be —a rotational—.

Column 8, line 33
  Page 16, line 21;
    After "base 20" insert—.—.

Column 10, line 50
  Page 21, line 12;
    "Continued" should be —continued—.

Column 11, line 14
  Page 22, line 10;
    "now De" should be —now be—.

UNITED STATES PATENT AND TRADEMARK OFFICE
CERTIFICATE OF CORRECTION

PATENT NO. : 5,330,149
DATED : July 19, 1994
INVENTOR(S) : Theodore M. Haan et al.

It is certified that error appears in the above-indentified patent and that said Letters Patent is hereby corrected as shown below:

Column 14, line 2
  Claim 24, line 7;
    "and-installed" should be --and installed--.

Signed and Sealed this

Seventh Day of February, 1995

Attest:

BRUCE LEHMAN

*Attesting Officer*       *Commissioner of Patents and Trademarks*